United States Patent [19]

Seibicke

[11] Patent Number: 4,466,153
[45] Date of Patent: Aug. 21, 1984

[54] DEVICE FOR WIPING A VEHICLE WINDOW

[75] Inventor: Horst Seibicke, Bühl-Altschweier, Fed. Rep. of Germany

[73] Assignee: Robert Bosch GmbH, Stuttgart, Fed. Rep. of Germany

[21] Appl. No.: 424,952

[22] Filed: Sep. 27, 1982

[30] Foreign Application Priority Data

May 15, 1982 [DE] Fed. Rep. of Germany ....... 3218373

[51] Int. Cl.³ .............................................. B60S 1/18
[52] U.S. Cl. ................................................ 15/250.16
[58] Field of Search ............ 15/250.16, 250.17, 250.27

[56] References Cited

U.S. PATENT DOCUMENTS

| 2,121,233 | 6/1938 | Horton | 15/250.16 X |
| 2,233,815 | 3/1941 | Horton | 15/250.16 X |
| 2,298,197 | 10/1942 | Coffey | 15/250.16 X |
| 2,357,152 | 8/1944 | Whitted | 15/250.17 |
| 3,025,552 | 3/1962 | Contant | 15/250.16 |
| 3,887,958 | 6/1975 | Fukasawa et al. | 15/250.17 |
| 3,942,385 | 3/1976 | Westedale | 15/250.17 X |

FOREIGN PATENT DOCUMENTS 820701 11/1951 Fed. Rep. of Germany ... 15/250.16

Primary Examiner—Philip R. Coe
Assistant Examiner—Frankie L. Stinson
Attorney, Agent, or Firm—Michael J. Striker

[57] ABSTRACT

A device for wiping a window of a vehicle, particularly a car, in which a pair of wipers are pivoted in the reciprocating pendulum motion between two holding positions, is provided with an arrangement for conveying the wipers from the reverse holding position to the park position in which the wipers are located outside of the wiping zone. This arrangement includes an adjustable joint provided on the transmission unit interconnected between the drive of the wiping device and the wipers. The adjustable joint actuated by an additional drive is put into operation after the main drive of the device has been switched off. The adjustable joint in cooperation with the transmission unit imparts to the wipers additional pivoting motion toward that park position.

6 Claims, 2 Drawing Figures

DEVICE FOR WIPING A VEHICLE WINDOW

BACKGROUND OF THE INVENTION

The present invention relates to a device for wiping a vehicle window, which device includes a pair of wiping elements pivoted in a reciprocating pendulum motion within a wiping zone defined by a wiping angle.

Some of conventional devices for wiping vehicle windows are provided with an arrangement for transmitting the wiping elements from their holding positions to so-called park positions in which the wipers are located outside of the wiping zone. One of the known arrangements of the type under consideration includes a magnet, an armature of which engages with a crank of a pendulum motion-transmission unit in a circular path in order to shut down the wiping device and disengages from a pin provided on the crank so that it is detached from the crank pin and the necessary additional pivoting movement of the wipers is effected. The time of insertion of the magnet armature into the circular path of the crank must be in the conventional arrangement exactly predetermined to provide that the crank element will run against the armature. This operation, however, causes undesired noise and wear of the components of the arrangement.

SUMMARY OF THE INVENTION

It is an object of the invention to provide an arrangement for displacing the wipers to so-called park positions, which avoids the disadvantages of the prior art.

Another object of the invention is to provide an improved device for wiping a vehicle window, which does not require magnets and armatures rigidly mounted on the vehicle.

These and other objects of the invention are achieved by a device for wiping a vehicle window, comprising at least one wiping element lying against a window to be wiped; a drive unit; a transmission unit operatively interconnected between the drive unit and the wiping element so that a reciprocating pendulum motion is imparted to said wiping element adapted to pivot between an advance holding position and a reverse holding position within a wiping zone; and means for transferring the wiping element from said reverse holding position to a park position located outside of said wiping zone, said means being actuated after the drive unit has been switched off and including an adjustable joint mounted in the transmission unit.

The device may include means for adjustment of that joint, including an adjustment drive actuated by an electric motor.

The transmission unit may include a crank connected to the aforementioned drive unit, said drive unit being adapted to impart a rotation motion to the crank, a coupling rod pivotally connected to the crank, and a rocking member pivotally connected to the coupling rod, the rocking member carrying a wiping shaft connected to said wiping element, the coupling rod and the rocking member being adjustably connected to the joint.

The adjustment means may further include a movable structural element positioned on the rocking member and connected to the coupling rod by a pivot pin.

The structural element may be provided with a curved toothed rim having an axis of rotation, said rim extending over more than 180°.

The movable structural element may be a rotatable gear connected to the adjustment drive and actuated thereby, said gear having a front face extending transversally of an axis of rotation of said gear, the pivot pin being positioned on the front face of the gear and eccentrically to the axis of rotation of the gear.

In accordance with further feature of the invention that gear may be a worm gear mated with a worm mounted on an output shaft of the adjustment drive.

The device of the invention may further include a connecting rod connected to the rocking member, a lever pivotally mounted to said connecting rod and carrying a second wiping shaft, and a second wiping element connected to the second wiping shaft so that synchronous movement of the aforementioned first wiping shaft and the second wiping shaft is provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCIPTION OF THE PREFERRED EMBODIMENTS

Figure 1:
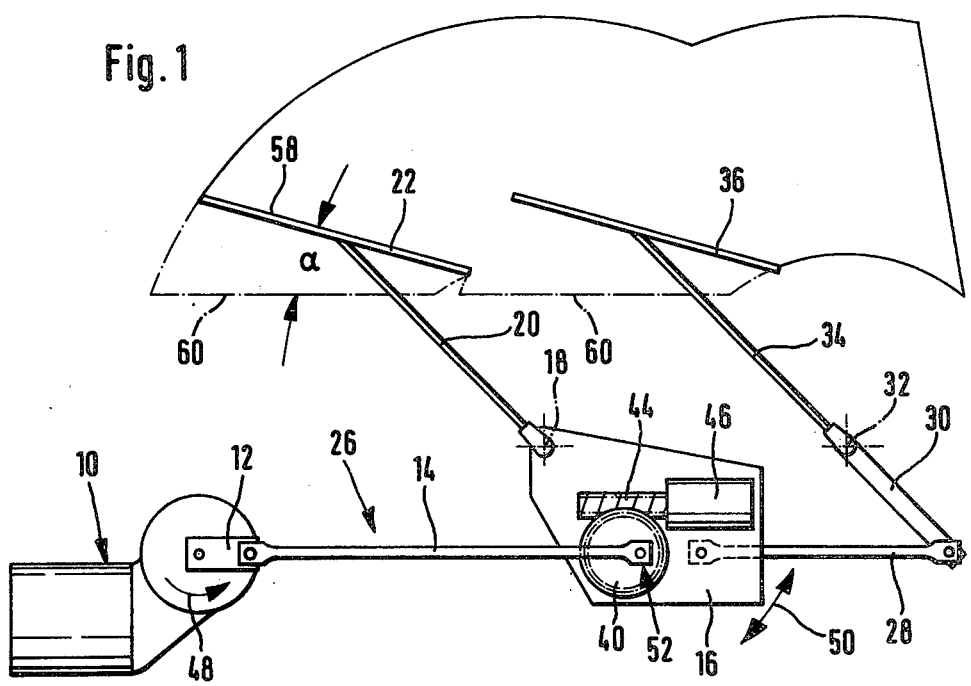
FIG. 1 is a schematic view of a device for wiping a vehicle window, with wiping elements shown in their reversed position.

Referring now to the drawings, a device for wiping a window of a vehicle, particularly a car, comprises a drive unit 10 which generates a rotation movement through a crank 12. A coupling rod 14 is pivotally connected to the crank 12 at its one end. The other end of the rod 14 is pivotally connected to a rocking member 16 which in turn is rigidly supported on a wiping shaft 18. Wiping shaft 18 carries a wiping arm 20 which is provided with a wiping blade or wiping element 22. The latter lies against the vehicle window not illustrated herein and is operative for cleaning the window within the wiping zone 24 defined by the wiping angle. Crank 12 forms together with the coupling rod 14 and rocking member 16 a pendulum motion-transmission unit which translates the rotary movement of crank 12 into a reciprocating pendulum motion of the rocking member 16. In operation the wiping device displaces the wiping element 22 between two reversed positions over the wiping zone 24 which has a shape of a segment.

A connecting rod 28 is pivotally supported at one end thereof on the rocking member 16 and at its opposite end it is pivotally connected to a lever 30. This lever is rigidly connected to a second wiping shaft 32 by means of which a second wiping arm 34 rigidly connected thereto and carrying a second wiping element 36 is moved. The connecting rod 28 translates the reciprocating pendulum motion of the rocking member 16 to lever 30 and thus to the second wiping element 36. Both wiping elements 22 and 36 are thus rotated in syncronism between an advance and reverse pendulum positions over the window to be wiped.

Figure 2:
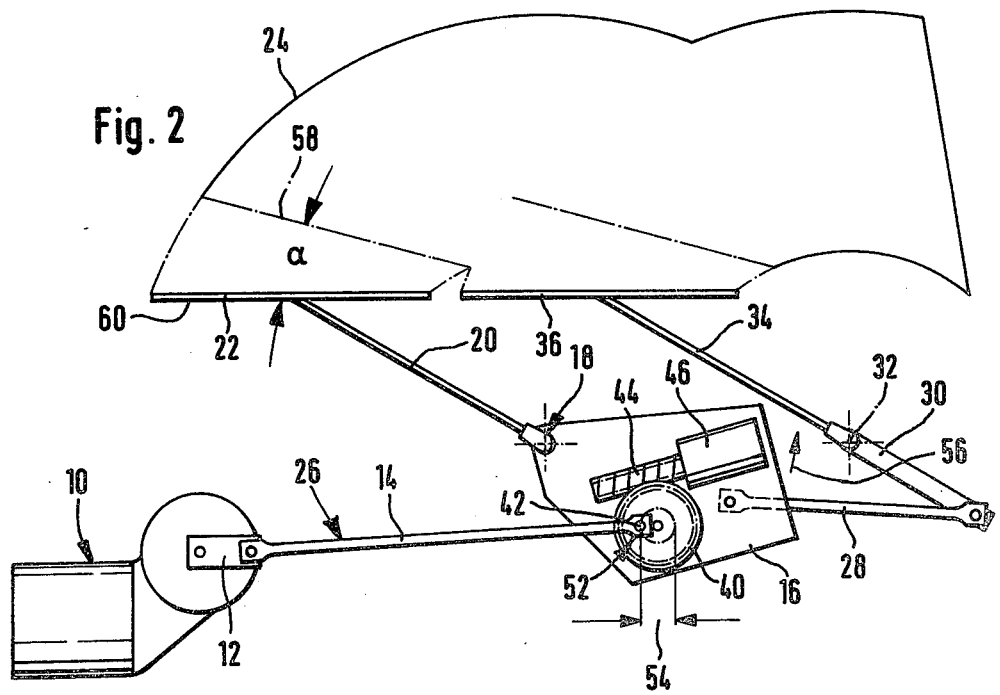
FIG. 2 is a schematic view of the device of FIG. 1 but with wiping elements illustrated in their park position.

A structural element 40 which is formed in the preferred embodiment as a worm gear is rotationally supported on the plate-like rocking member 16. At the front face of the structural element 40 is mounted a pivot pin 42 which is arranged eccentrically to the axis of rotation of the element 40. This structural element may be formed independently as a gear segment having a curved toothed rim rotatable about a center of curvature of the rim. As shown in FIG. 2 the end of the coupling rod 14 facing away from the crank 12 is pivotally supported on the pivot pin 42 so that both structural members 14 and 16 of the pendulum motion-transmission unit are connected to each other. The pivot pin 42 formed as a ball is positioned eccentrically to the axis of rotation of the worm gear 40. The worm gear 40 is in mesh with a worm 44 which is connected to an output shaft of an electromotor of an adjustment drive unit 46. The adjustment drive unit 46 is rigidly supported on the plate-like rocking member 16.

In operation of the device for wiping a vehicle window the crank 12 rotates in the direction of arrow 48. Thereby the coupling rod 14 imparts to the rocking member 16 a reciprocating pendulum motion about an axis of the wiping shaft 18, as shown by arrows 50. This pendulum motion is further translated through connecting rod 28 to lever 30, wiping arm 32 and second wiping element 36. When the wiping device is inoperative, the first wiping element 22 remains in the holding position shown in FIG. 1. The second wiping element 36 is also in its holding position at this time. In order to transfer wiping elements 22 and 36 from those holding positions to their park positions in which the wiping elements are covered in the carriage part of the car, the adjustment drive unit is actuated and the joint 52 of the pivot pin 42 will rotate together with the worm gear 40 about its axis of rotation by an angle from 40° to 180°. The joint 52 will thus be displaced a distance denoted as 54 and will take a position illustrated in FIG. 2, the distance 54 corresponding to the double eccentricity of the pivot pin 42. The rocking member 16 in this adjustment motion will pivot in the direction of arrow 56 (FIG. 2) and take along the wiping shaft 18 and wiping arm 20 with the wiping element 22. The latter will thereby move from its pendulum reversed or holding position denoted as 58 to its park position designated as 60 (FIG. 2). When the device for wiping a vehicle window is to be again put into operation the wiping element 22 should be first brought, via the adjustment drive unit 46, into its position shown in dotted lines in FIG. 2 and then the drive unit 42 should be shut down. Thereafter the drive unit 10 is switched on to put into operation the device for wiping a vehicle window.

The above described transfer movement of the wiping element 22 from its holding position to its park position is, of course, translated into the similar transfer motion of the second wiping element 36 via the connecting rod 28, lever 30, wiping shaft 32 and wiping arm 34 such that both wiping elements are displaced to their park positions in syncronism with each other.

The adjustment drive unit 46 is provided in accordance with the preferred embodiment with an electromotor which is adapted to be switched on and off such that its operation is made possible only when the drive unit 10 is inoperative. When the device for wiping a vehicle window is to be switched on again, first the adjustment drive unit 46 is acturated to set wiping elements 22 and 36 into positions shown in FIG. 1. After the adjustment drive unit 46 has been switched off the drive unit 10 is turned on and the reciprocating pendulum motion of wiping elements 22 and 36 is started.

In some instances it can be advantageous that if the rotation angle of the worm gear 40 is less than 180° there are some possibilities of the selection of the transmission angle $\alpha$ by various arrangements of the kinematics of the transmission unit. It is to be further recognized that the adjustment drive unit 46 can be positioned not only on the rocking member 16 but on the other components of the pendulum-motion unit, for example on the coupling rod 14.

It should be noted that the above described additional displacement of the wiping elements from the holding positions 58 to the park positions 60 and vice versa can be adjusted to respective structural conditions of the vehicle, for example to the type of the vehicle; this adjustment can be carried out, for example, by changing the eccentricity of joint 52 on the worm gear 40.

Since the additional displacement of the wiping elements and their displacement caused by the drive unit 10 are performed in both cases in the same direction the switching expenditures in the operation of the device according to the invention can be negligible.

The drive motor of the drive unit 10 should only provided for the wiping angle including the pendulum-motion angle plus the additional displacement angle $\alpha$; therefore a relatively compact drive motor can be used in the device according to the invention. Inasmush as relatively high forces in this displacement movement over angle $\alpha$ are overcome by strong transmission units 40, 44 one can afford a very small drive motor in the adjustment drive unit 46.

It will be understood that each of the elements described above, or two or more together, may also find a useful application in other types of devices for wiping vehicle windows differing from the types described above.

While the invention has been illustrated and described as embodied in a device for wiping a vehicle window, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for wiping a vehicle window, comprising at least one wiping element lying against a window to be wiped; a drive unit; a transmission unit operatively interconnected between said drive unit and said wiping element so that a reciprocating pendulum motion is imparted to said wiping element pivoting between an advance holding position and a reverse holding position within a wiping zone; said transmission unit including a crank connected to said drive unit, said drive unit imparting a rotation motion to said crank, a coupling rod pivotally connected to said crank, and a rocking member pivotally connected to said coupling rod, said rocking member carrying at least one wiping shaft connected to said wiping element; means for transferring said wiping element from said reverse holding position to a park position located outside of said wiping zone, said transferring means being actuated after said drive unit has been switched off and including an adjustable joint mounted on said rocking member; and means for adjustment of said adjustable joint, said coupling rod and said rocking member being adjustably connected to said joint, said adjustment means including an adjustment drive, a worm connected to said adjustment drive, and a rotatable worm gear meashing with said worm and actuated thereby, a pivot pin pivotally connecting said worm gear to said rocking member, said worm gear and said adjustment drive being positioned on said rocking member.

2. The device as defined in claim 1, wherein said adjustment drive is an electromotor.

3. The device as defined in claim 1, wherein said pivot pin is ball-shaped.

4. The device as defined in claim 1, further including a connecting rod connected to said rocking member, a lever pivotally mounted to said connecting rod and carrying a second wiping shaft, and a second wiping element connected to said second wiping shaft so that synchronous movement of said aforementioned wiping shaft and said second wiping shaft is provided.

5. The device as defined in claim 1, wherein an eccentricity of said pivot pin with respect to the axis of rotation of said gear is changeable.

6. The device as defined in claim 5, wherein the maximal angle of rotation of said gear in its adjusting movement is 180°.

* * * * *